Patented Aug. 10, 1954

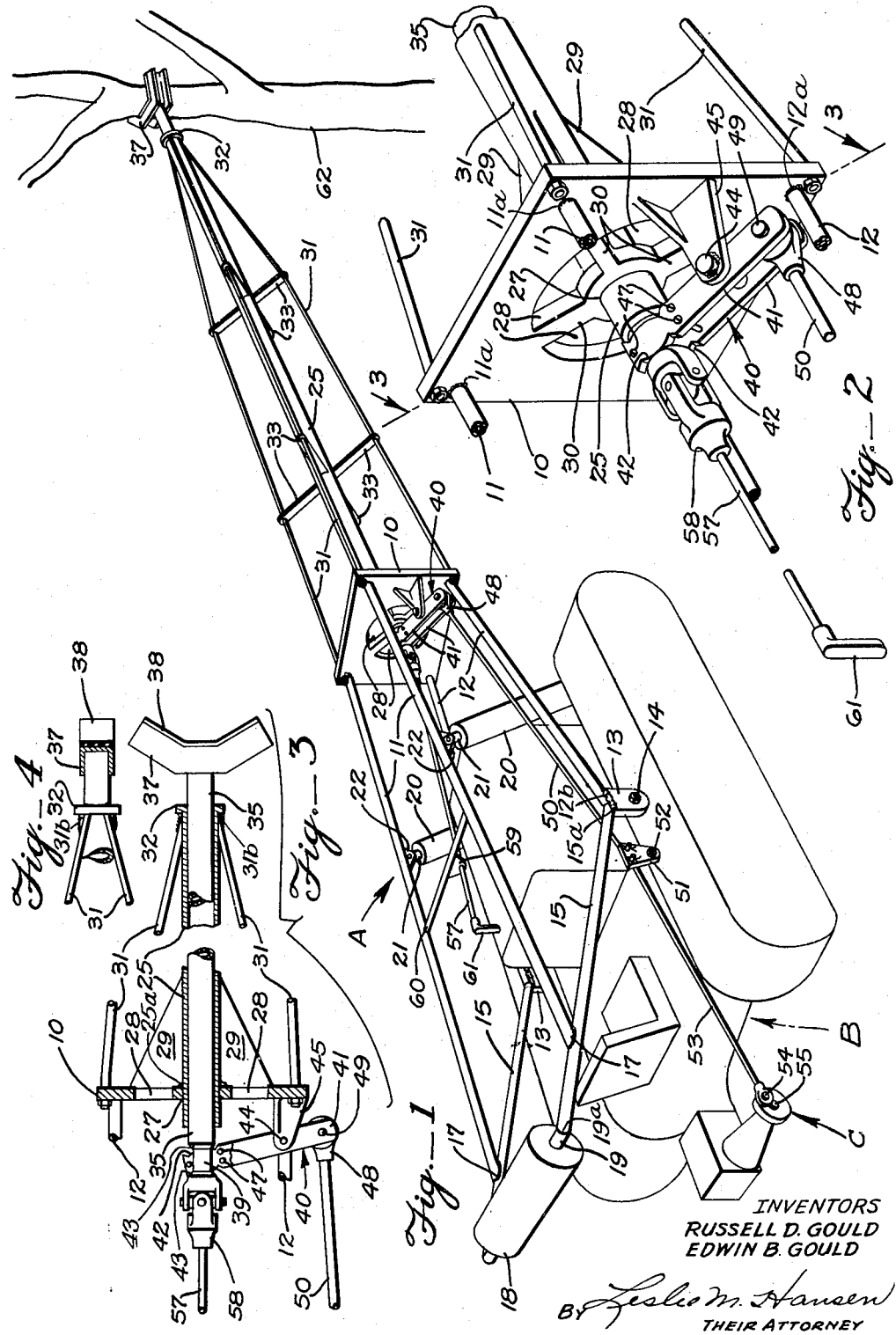

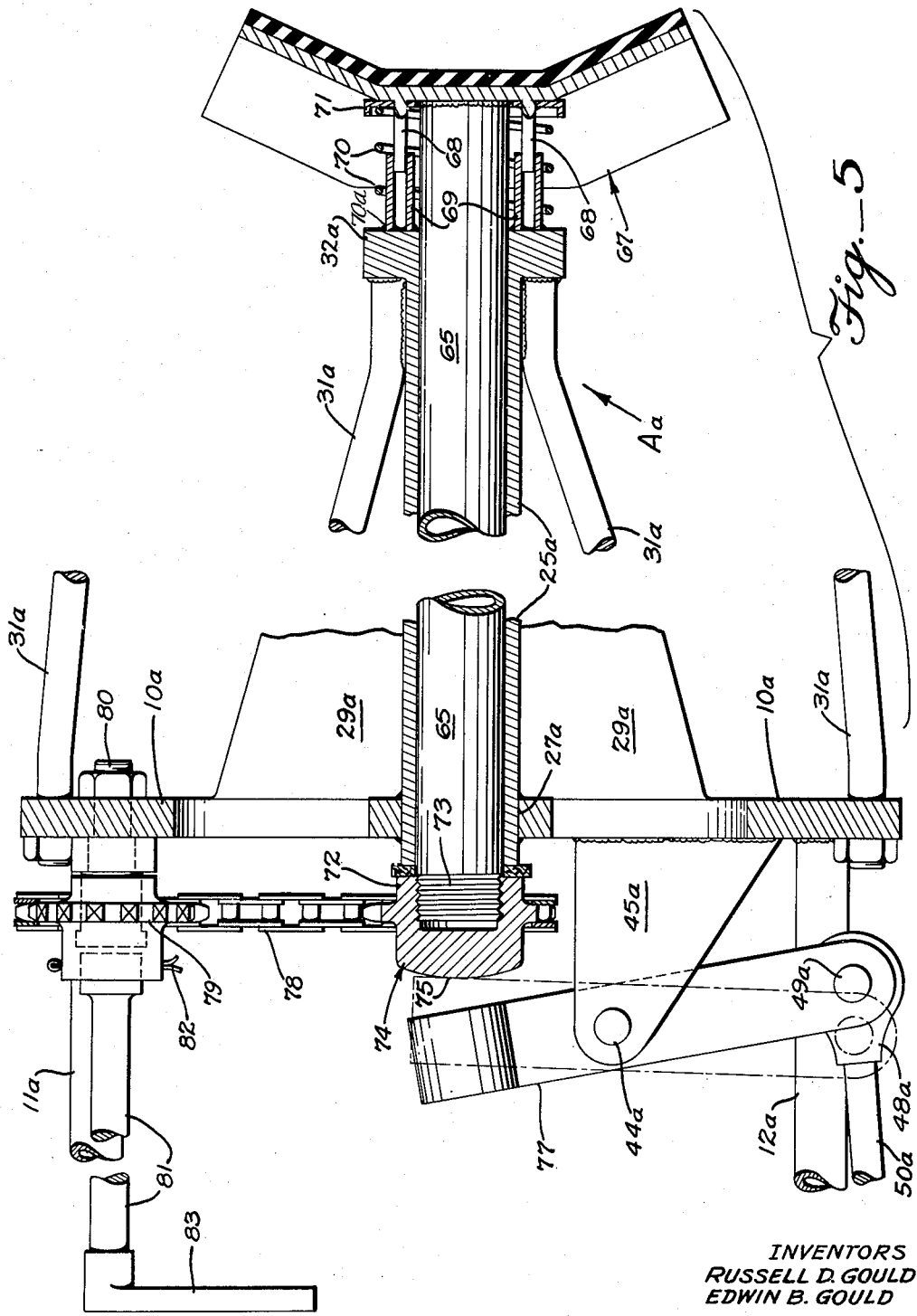

2,685,775

UNITED STATES PATENT OFFICE 2,685,775

TREE SHAKER

Russell D. Gould and Edwin B. Gould,
San Jose, Calif.

Application March 11, 1952, Serial No. 275,922

7 Claims. (Cl. 56—328)

The present invention relates to harvesting mechanism, and pertains more particularly to a tree shaker for shaking down nuts or fruit borne upon the tree.

A number of mechanized tree shakers have been developed in the past, but many of such shakers have been slow or difficult to manipulate, or have been apt to damage the trees when placed in operation.

The present invention contemplates the provision of an improved tree shaker. Further, the invention provides for a tree shaker which imparts momentum for shaking in the direction in which the shaker approaches a tree for shaking. Provision also is made to facilitate the placing of the mechanism in operation and to direct the tree shaking instrumentality into actuating engagement with the tree in such a manner as to avoid injury to the trees subjected to the shaking operation.

These and other objects and advantages of the invention will be apparent from the following description and the accompanying drawings, wherein:

Fig. 1 is a view in perspective of a tree shaking mechanism in position against a tree, the supporting tractor being shown in broken lines.

Fig. 2 is an enlarged fragmentary view in perspective of a portion of the tree shaking mechanism shown in Fig. 1.

Fig. 3 is a fragmentary sectional view taken along line 3—3 of Fig. 2, intermediate portions of a boom assembly being broken away.

Fig. 4 is a fragmentary elevational view taken at an angle of 90° from Fig. 3, the yoke for engaging the tree during a tree shaking operation being broken away and shown sectionally.

Fig. 5 is an enlarged fragmentary sectional view generally similar to Fig. 3 showing a modified form of the invention.

Referring first to the form of the invention shown in Figs. 1 to 4 inclusive, the tree shaker comprises a boom A tiltably mounted on the frame of a crawler type tractor B and arranged to be driven from the usual power take-off, not shown of the tractor by a drive mechanism C.

The boom A comprises a central plate member 10 which may be of steel approximately one-half inch thick. Two tubular upper boom frame members 11 and lower boom frame members 12 are welded at 11a and 12a, respectively one adjacent each corner of the boom plate 10 to extend rearwardly therefrom. The rear ends of the two lower longitudinal boom members 12 are welded at 12b to pivot plates 13, which in turn are pivotally mounted on a pair of coaxially positioned pivot studs 14 secured to extend laterally one from each side of the tractor B. A rearwardly and upwardly extending boom frame member 15 is provided on each side of the boom structure, the forward end of each member 15 being welded 15a to one of the pivot plates 13. The rear end of each of the upper rear boom frame members 11 is welded at 17 to an intermediate portion of each upwardly sloping member 15. A counterweight 18 is mounted on a tube 19 welded at 19a to extend transversely across the rear ends of the boom members 15. A pair of hydraulic cylinders 20 of a conventional type are pivoted at their lower ends (not shown) to the tractor B. Piston rods 21 of the cylinders 20 are pivotally connected at their upper ends to brackets 22 secured one to each of the upper boom members 11. Hydraulic control mechanism of a conventional type, not shown, such as, for example, that supplied with the 1954 models of Ferguson or Ford tractors, or that disclosed in United States Patent No. 2,671,316 may be employed selectively to admit hydraulic fluid under pressure above or below the usual pistons therein to extend or retract the piston rods 21 as required to control the tilting of the boom A about the pivot studs 14.

The forward portion of the boom A beyond the plate 10 comprises a tube 25 welded at 25a in position in a central opening 27 in the boom plate 10. The plate 10 also has four spaced segmental openings 28 therein disposed symmetrically around the central hole 27. Four generally triangular bracing plates 29 are mounted one on the outer side of each of the strips 30 of the plate 10 which separate adjacent segmental openings 28 therein. Four truss rods 31 extend one from each corner of the plate 10 to the outer end of the tube 25. The forward ends of the rods 31 are welded to the tube 25 and to a flange 32 which surrounds the forward end of the tube 25. Two sets of truss stays 33 are provided between the truss rods 31 and the tube 25.

An inner tube 35 is mounted for relative axially slidable and rotative movement within the tube 25 and is arranged to project from both ends of the tube 25. A tree engaging yoke 37 is mounted to extend transversely of the projecting forward end of the inner tube 35, the forward side of the yoke being provided with a pad 38 which may be of soft or resilient material such as rubber. A portion 39 of reduced diameter is provided in the projecting rear end portion of the inner tube 35.

The reduced tube portion 39 is of a diameter to fit into the divided free end portion of an actuating lever 40. The lever 40 comprises two side members 41 spaced apart to receive the reduced tube portion 39 therebetween. The portions 42 of the side members 41 adjacent the reduced shaft portion 39 are rounded to maintain contact with shoulders 43 at the ends of the reduced portion 39 of the inner tube 35 during oscillation of the lever 40 and reciprocation of the inner tube 35 in a manner to be described later herein.

The two lever side portions 41 are secured in relatively spaced relation by screws 47, and are pivotally mounted at a point substantially midway of their length on a pivot pin 44 supported in a pair of standards 45. The standards 45 in turn are mounted to extend rearwardly from the apertured plate 10. A bearing member 48 is pivoted on a pin 49 on the outer end of the lever 40, and is connected by a reciprocable rod 50 to a rocking plate 51 pivotally mounted on a pivot bolt 52 secured to the tractor B. A second reciprocable rod 53 is connected from the rocking plate 51 to a drive pin 54 mounted eccentrically on a shaft 55 which has conventional driven connection, not shown, with the usual power take-off mechanism, also not shown, of the tractor B.

A rod 57 for rotative adjustment of the yoke 37 is connected to the rear end of the inner tube 35 by means of a conventional universal joint 58. The rod 57 is rotatively mounted in a bearing bracket 59 mounted on a transverse frame member 60 secured to and extending between the upper rear boom members 11. A manipulating handle 61 is provided on the rear end of the rod 57, and by means of this handle the rod 57 and inner tube 35 may be rotatively adjusted to turn the tree engaging yoke 37 to a desired position to engage a tree for shaking.

In operating the mechanism illustrated in Figs. 1 to 4 inclusive, the tractor B is manipulated to direct the boom A toward the trunk or a limb of a tree 62 which it is desired to engage for shaking. The tractor is advanced and the boom A is raised or lowered as desired by usual hydraulic controls, not shown, which are employed to extend or retract the piston rods 21 of the hydraulic cylinders 20 to bring the yoke 37 to a desired height to engage the tree. During this period of manipulation, the power take-off driven shaft 55 preferably is stationary, it being held inoperative by usual power take-off clutch control means, not shown. As the yoke 37 is brought adjacent the tree trunk or limb to be engaged, the inner shaft 35 may be moved rotatively by means of the handle 61. When the yoke 37 is brought into engagement with a desired point on the tree, the tractor B is advanced a slight distance further so as to place the tree or limb under bowing stress.

The power take-off driven shaft 55 then is rotatively driven from the power take-off of the tractor through usual clutch control means, not shown. The rotation of the shaft 55 causes the rods 50 and 53 to reciprocate, the rocking plate 51 to oscillate, and the lever 40 to oscillate about its pivot 44. This oscillation of the lever 40 causes the inner shaft 35 to reciprocate, which, by means of the yoke 37 mounted thereon, produces a violent shaking of the tree 62 to which the yoke is applied. A shaking period of from two to five seconds usually is sufficient to shake the nuts out of the portions of the tree closely associated with that engaged by the yoke 37. Upon completion of each shaking operation, the power take-off is deenergized and the tractor is backed away from the tree to clear it, whereupon the tractor can be manipulated to a desired point for the next shaking operation.

In the modified form of the invention shown in Fig. 5, many of the parts are substantially identical to those described previously herein for the form of the invention illustrated in Figs. 1 to 4 inclusive. Such substantially identical parts will be designated by the same numerals as are applied thereto in the structure shown in Figs. 1 to 4 inclusive with the suffix $a$ added thereto.

The structure shown in Fig. 5 comprises a boom $Aa$ generally similar to the boom A shown in Figs. 1 to 4 inclusive. An inner tube member 65 is slidably and rotatably mounted in the tube $25a$ in a manner generally similar to the inner tube 35 of the boom structure A shown in Figs. 1 to 4 inclusive.

A tree engaging yoke 67, somewhat similar to the yoke 37 shown in Figs. 1, 3 and 4, is mounted on the forward end of the inner tube 65. Guide pins 68 are secured to the rear side of the yoke 67 axially parallel to the inner tube 65, and these pins are slidably inserted in tubular guide members 69 welded at $70a$ to extend forwardly from the flange $32a$ on the forward end of the boom tube $25a$. A coil spring 70 encircles the forwardly projecting end portion of the inner tube 65 and guide tubes 69 and is held in compression between a flanged plate 71 mounted on the rearward side of the yoke member 67 and the forward flange $32a$ of the boom tube $25a$.

A sprocket member 72 is screwed onto the threaded rear end portion 73 of the inner tube 65, the sprocket having a cap-like hub portion 74 with the rear side thereof thickened and domed at 75 to provide a striking face for a hammer lever 77. A usual link drive chain 78 is trained around the sprocket 72 and also around a second sprocket 79 pivoted on a stud 80 mounted on the plate $10a$.

A rod 81 for rotatively adjusting the yoke 67 is secured to the sprocket 69 by a cotter pin 82. The rod 81 is provided with a handle 83 on its rear end which is mounted within convenient reach of an operator, not shown, of the tractor B, similarly to the handle 61 in Fig. 1 so that the operator may rotate the central shaft 65 by means of the chain 78 and sprockets 72 and 79 to guide the yoke 67 into proper rotative position for engaging a tree for shaking.

The hammer lever 77 is pivotally mounted similarly to the lever 41 of Figs. 1, 2 and 3 on a pivot pin $44a$ mounted in standards $45a$. A rod-end bearing member $48a$ is pivotally mounted on a pin $49a$ in the outer end of the hammer lever 77 and to this bearing $48a$ is connected a rod $50a$ similar to the rod 50 in Fig. 1. The rod $50a$ is connected to a suitable reciprocating mechanism, not shown, such as, for example, that shown in Fig. 1.

The mechanism shown in Fig. 5 is operated in a manner generally similar to that shown in Figs. 1 to 4 inclusive, with the exception that the structure shown in Fig. 5 may be operated by a constantly rotating power take-off mechanism as well as by one which is clutch controlled.

With the structure shown in Fig. 5, the tractor is manipulated, the boom $Aa$ is elevated or lowered as required, and the yoke 67 moved rotatively properly to engage a tree for shaking.

During such manipulations of the tractor boom and yoke, the hammer lever 77 may be operated constantly since the hammer does not contact the domed striking anvil 75 as long as the inner tube 65 is retained in its forward position as shown in Fig. 5 under the bias of the coil spring 70. When the yoke 67 is moved forwardly into engagement with a tree element, however, and the tractor is advanced to place the tree under a bowing stress, the inner tube 65 will be moved relatively rearwardly, overcoming the bias of the spring 70 and placing the striking anvil 75 of the sprocket 72 within the zone of oscillation of the hammer lever 77. The hammer lever 77 thereupon will move the inner tube assembly to shake the tree, the resilient force of the tree itself will force the inner tube 65 rearwardly upon each rearward oscillating stroke of the hammer 77. Upon completion of each such tree-shaking operation the tractor B is backed away to clear the tree, whereupon the spring 70 again will move the inner tube assembly relatively forwardly to bring the domed anvil surface 75 beyond the zone of oscillation of the hammer lever 77.

While we have illustrated and described a preferred embodiment of the present invention, and one modification thereof, it will be understood however, that various other changes and modifications may be made in the details thereof without departing from the spirit and scope of the invention as set forth in the appended claims.

Having thus described the invention, what we claim as new and desire to protect by Letters Patent is defined in the following claims:

1. A tree shaker comprising a boom, a pivotal mount on said boom said mount being constructed for connection to a vehicle for mounting the boom for fore and aft tilting movement on an automotive vehicle with a free outer end of the boom directed endwise of the vehicle from said mount, control means mounted on said boom and constructed for connection to a tractor element for controlling the elevation of the free outer end of the boom, a shaker element mounted on the boom in lengthwise slidable and rotatable relation to said boom, said shaker element extending from the tractor to the free end of the boom, an outwardly facing tree engaging portion mounted on the shaker member at the free end of the boom, an oscillating lever mounted endwise adjacent the tractor end of said shaker member, power driven means drivingly connected to said lever to oscillate said lever throughout a predetermined arc, and biasing means engaging said shaker member in a direction to urge the latter endwise beyond said predetermined arc of lever oscillation, said biasing means being of sufficient strength to retain the shaker member, when free, beyond said arc, and to be overcome by a thrusting of said tree engaging portion against a tree for shaking, thereby to move the shaker member into the arc of lever oscillation for reciprocation of the shaker member and the yoke thereon.

2. A tree shaker for mounting on a tractor comprising a boom, a pivotal mount on said boom said mount being constructed for connection to a tractor element for mounting the boom for tilting movement on a tractor, control means connected to the boom and constructed for connection to a tractor element for controlled tilting movement of the boom, an outer tube mounted lengthwise of the boom, an inner tube mounted telescopically within said outer tube for free lengthwise sliding and rotative movement therein, an outwardly facing yoke mounted on the outer end of said inner tube, control means operatively connected to said inner tube, a portion of said control means being located within reach of the tractor operator and movable to rotate said inner tube and the yoke thereon to adjusted position, means biasing the inner tube axially outwardly in the outer tube, stop means mounted to limit biased outward movement of the inner tube relative to the outer tube, and drive means mounted adjacent an end of said inner tube and normally out of engagement therewith, said biasing means being of a strength to be overcome by a predetermined pressure on the yoke to move the inner tube into engagement with the drive means for reciprocation thereby.

3. A tree shaker for mounting on a vehicle comprising a boom, a pivotal connection on said boom, said mount being constructed for connection to a vehicle for pivotal movement of the boom about a horizontal axis disposed transversely of the vehicle, control means mounted on the boom and constructed for connection to a vehicle element to tilt the boom to adjusted position relative to a vehicle upon which it is mounted, said boom comprising a central axial tube, bracing means extending lengthwise of said tube to resist lateral deflection thereof, a rigid shaking member inserted to extend lengthwise entirely through said tube and having bearing support therein for rotative and reciprocative movement relative to said tube, control means mounted on said shaking member, an element of said control means extending within reach of a vehicle operator rotatively to adjust said shaking member relative to said tube, a tree engaging portion on an outer end of said shaking member thereto for axial and rotative movement with said shaking member, and power means connected to an inner portion of said shaking member beyond said tube to reciprocate said shaking member with said tree engaging portion in stressing engagement with a tree.

4. A tree shaker comprising a boom, a pivotal support connecting the boom to an automotive vehicle for tilting movement of the boom in a vertical plane, a free end of the boom extending endwise from the vehicle, controlled adjusting means mounted between the boom and the vehicle upon which it is mounted to tilt the boom relative to the vehicle and thereby adjust the elevation of said free boom end, a guide element on the boom, a rigid member journaled in said guide member and extending lengthwise of the boom in relative axially slidable and rotative relation thereto, manual control means operatively connected to said rigid member for rotative adjustment of the latter, an outwardly facing concavely curved tree engaging member mounted on the forward end of said rigid member for rotative and reciprocal movement therewith, and power drive means releasably connected to said rigid member for reciprocating said rigid member and the tree engaging member thereon lengthwise of said boom.

5. A tree shaker for mounting on a tractor comprising a boom, a pivotal mount on said boom, said mount being constructed for connection to a tractor element for mounting the boom for vertical tilting movement on a tractor with a free outer end of the boom extending endwise of the tractor from said pivotal mount, hydraulically extensible control means mounted on said boom in spaced relation to the pivotal axis of said pivotal mount, a portion of said control means formed for connection to a tractor to control the elevation of the free end of the boom, a shaker element mounted on the boom in lengthwise slidable and rotatable relation thereto and extending from a point adjacent said pivotal mount to the free outer end of the boom, an outwardly facing tree engaging yoke mounted transversely on the free outer end of said shaker element, and reciprocating drive means connected to the shaker element and constructed and arranged for connection to a tractor power element for reciprocating the shaker element and the yoke longitudinally of the boom.

6. A tree shaker for mounting on a tractor comprising a boom, a pivotal mount on said boom, said mount being constructed for connection to a vehicle for mounting the boom on a vehicle for pivotal movement about a horizontal axis, control means mounted on said boom and constructed for connection to a vehicle element to adjust the angular position of the boom about its pivotal axis, a rigid element mounted on the boom in lengthwise slidable and rotatable relation thereto, a cushioned outwardly facing tree engaging member mounted on the outer end of said rigid member, a sprocket on the inner end of said rigid member, a second sprocket spaced laterally from said first sprocket and in driving engagement therewith, manual control means connected to the second sprocket and extending within reach of a tractor operator to control rotative adjustment of said sprockets and thereby of the rigid member and the tree engaging portion thereon, a spring operatively engaging the rigid member in a direction to urge it outwardly on the boom, stop means mounted to limit outward movement of the rigid member under the biasing force of said spring, a striking lever pivotally mounted with one end thereof disposed rearwardly of said rigid member, and drive means operatively connected to said lever to oscillate said one end of said lever in a plane intersecting the rigid member lengthwise thereof, the arc of lever oscillation being located endwise beyond the rigid member in its outwardly urged condition by said spring, said spring being of a strength to be overcome by a predetermined inward pressure on the tree engaging portion to move the rigid member inwardly into the arc of oscillation of said one end of the striking lever for reciprocation thereby.

7. A tree shaker for mounting on a vehicle comprising a boom, a pivotal mount on said boom, said mount being constructed for connection to a vehicle for mounting the boom on a vehicle for pivotal movement about a horizontal axis, control means connected to the boom and constructed for connection to a vehicle element, said control means being operable to adjust the boom to a required angle relative to a vehicle upon which it is mounted, a guide tube extending lengthwise throughout a substantial portion of the boom, a rigid member of greater length than said guide tube inserted in said guide tube and free for rotative and axial reciprocative movement therein, a control handle connected to an inner portion of said rigid member and extending within reach of a vehicle operator rotatively to adjust the rigid member within said guide tube, a tree engaging portion mounted on the outer end of said rigid member beyond said guide tube for rotative and reciprocative movement with the rigid member, and power drive means operatively engaging an inner portion of said rigid member to reciprocate said rigid member lengthwise within said guide tube.

References Cited in the file of this patent

UNITED STATES PATENTS

| Number | Name | Date |
|---|---|---|
| 1,472,262 | Abildgaard | Oct. 30, 1923 |
| 2,159,311 | Berger | May 23, 1939 |

OTHER REFERENCES

Diamond Walnut News, Sept. 1949, page 8.